(12) United States Patent  (10) Patent No.: US 6,270,599 B1
Wood  (45) Date of Patent: Aug. 7, 2001

(54) HEAT-WELDING OF PLASTICS BY RADIATION

(75) Inventor: John Wood, Rushden (GB)

(73) Assignee: John Wood Enterprises Limited, Raunds (GB)

( * ) Notice: Subject to any disclaimer, the term of this patent is extended or adjusted under 35 U.S.C. 154(b) by 0 days.

(21) Appl. No.: 09/214,246

(22) PCT Filed: Jul. 14, 1997

(86) PCT No.: PCT/GB97/01901

§ 371 Date: Apr. 14, 1999

§ 102(e) Date: Apr. 14, 1999

(87) PCT Pub. No.: WO98/02294

PCT Pub. Date: Jan. 22, 1998

(30) Foreign Application Priority Data

Jul. 12, 1996 (GB) .................................................. 96 14659

(51) Int. Cl.$^7$ ....................................................... B32B 31/26
(52) U.S. Cl. ........................... 156/64; 156/93; 156/272.2; 156/272.7; 156/304.3; 156/378; 156/380.9
(58) Field of Search ........................... 156/64, 93, 272.2, 156/275.7, 304.3, 304.6, 308.2, 378, 380.1, 380.9

(56) References Cited

U.S. PATENT DOCUMENTS

| | | | | |
|---|---|---|---|---|
| 3,678,276 | * | 7/1972 | Lampi et al. | 156/64 |
| 4,410,381 | * | 10/1983 | Chapman, II | 156/64 |
| 5,512,126 | * | 4/1996 | Kannabiran et al. | 156/380.9 |
| 5,840,147 | * | 11/1998 | Grimm | 156/272.2 |

FOREIGN PATENT DOCUMENTS 0 337 776 A2  10/1989  (EP) .
WO 95/21737    8/1995  (WO) .

* cited by examiner

Primary Examiner—Michael W. Ball
Assistant Examiner—Michael A. Tolin
(74) Attorney, Agent, or Firm—Chapman and Cutler

(57) ABSTRACT

Method and apparatus for heat-welding two members by applying radiation, such as infra-red radiation, through one of the members to enter layer(s) interposed between the two members. Method relies on inclusions through thickness of the layer(s) to be responsive to said radiation to raise temperature through thickness and promote bonds at interfaces with surfaces of said members. The bonds are assessed using thermal imaging camera detecting a near visible radiation arising from the layer(s), which radiation is different from infra-red used for heating.

10 Claims, 5 Drawing Sheets

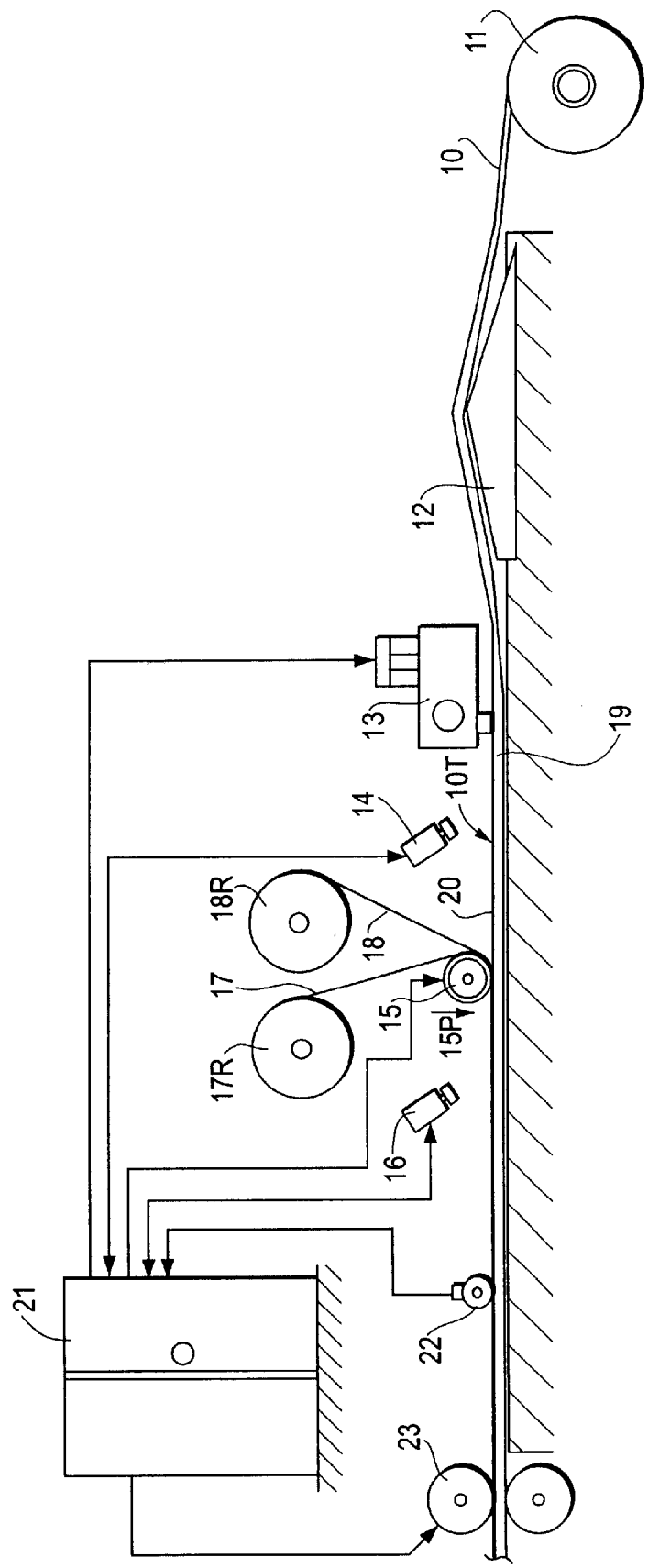

HEAT-WELDING OF PLASTICS BY RADIATION

FIELD OF THE INVENTION

This invention relates to method and means for welding such as plastics sheet or strip including as a seal over seaming of plastics or plastics coated material.

BACKGROUND OF THE INVENTION

The invention has arisen specifically relative to so-called Insituform (Registered Trade Mark) tube used to proprietary process or method of "no-dig" relining of typically underground services or utilities supply pipes. A flexible tube of coated woven or felt-type sheet material having a sewn seam is readily installed into an existing said pipe, say by inversion using a head of water; and usually before being impregnated with thermoset plastic material, such as polyester or epoxy resin. Water pressure within such tube of appropriate size can expand and force it into tight fit against interior of the host pipe; and subsequent heating of such water, typically as circulated from an above-ground boiler, can aid curing of the resin to form a solid durable lining or re-lining of existing host pipe, typically of diameters from about 100 millimetres or less to about 3 metres or more.

Typical such Insituform tube is made on a production line by sewing together long edges of folded-over plastics coated felt material strip of appropriate width to form a "lay-flat" tube of desired size. Coating on the felt material is usually applied by the felt manufacturer/supplier before shipping to the Insituform tube production plant, and is typically of thermoplastics material, specifically polyurethane (PU) or polyethylene (PE), in a thickness usually up to about 0.5 millimetre. It is important that Insituform tube affords a fully sealed pipe lining after installation; and any incidence of leaks or dripping of impregnating resin during installation are problematic, i.e. need to be avoided. Sealing of said seams of lay-flat tube as supplied to field sites for installation is thus required, and needs to be of a good and reliable nature. Two methods seam sealing are known or have been proposed.

One such method relies on solvent bonding a plastics tape over the seam, typically about 65 millimetre width of about 0.3 millimetre thick PU tape that is bonded using tetrahydrafuran (THF) solvent. Whilst equipment required is readily incorporated into production lines for lay-flat sewn-seam tube that is PU-coated, practical solvents that afford similar possibilities for PE-coated felt are not available. Moreover, even for PU-coated tube, use of THF can give rise to health and safety concerns.

The other such method relies on extruding a bead of molten plastics onto said sewn seams, then rolling still-soft extruded bead flat over and to cover/seal the seam, including fusing with the coating. Whilst this method is applicable in principle to either PU or PE coatings, there are practical problems. Thus bead extrusion is not readily started and stopped at will due to heating requirements and control relative to flow characteristics that must be achieved and maintained, which conflicts with norms for sewn-seam Insituform tube production lines where sewing machine and felt guidance operations tend to be subject to frequent interruptions, thus stops. Indeed, two separate production stages would appear to be required, with inevitable result of duplication of materials stacking and feed systems and extra staff requirement. Also, bead processing speed is limited by cooling rate of the plastics material concerned, which tends to be particularly slow for PE, thus further leads to requirement for substantial length of run-off space etc before further handling and/or use of cooling equipment which would be expensive to install. Extrusion thus looks an expensive option in terms of sophisticated capital equipment for extrusion possibly also cooling.

SUMMARY OF THE INVENTION

An object of this invention is to provide alternative method and/or means that can mitigate such problem(s), at least in application to producing Insituform tube.

According to first method and apparatus aspects of this invention, joining two members by heat-welding involves applying radiation through one of the members to layer(s) interposed between the two members and having inclusions through thickness thereof which inclusions are responsive to said radiation to raise temperature of said layer(s) through thickness thereof and promote bonds at interfaces with surfaces of said members.

Preferably, heat absorbed by said inclusions renders said layer(s) deformable, and pressure applied transversely of said layer(s) to bring said members together will deform said layer(s) to accommodate interface irregularity; and where said one member has low thermal conductivity and sufficient thickness to be cool enough at another surface thereof to allow freely rolling or sliding contact therewith, said pressure is applied by means making such rolling or sliding contact.

Said radiation can be applied only through said one member, and is preferably at least partially (typically less than 50%), reflected back into said layer(s) by the other of said members; said radiation can be applied to said one member through a or said means making rolling or sliding contact therewith; and said reflection by said other member can be after transmission from said layer through interface to radiation-transmissive coating on said other member.

First and second superposed component parts of said layer(s) may have inclusions that are, as sequentially encountered by said radiation, responsive as aforesaid to lesser and greater amounts, respectively.

Said radiation can be infra-red (preferably in near visible range) to which said one member is substantially transparent, with said layer(s) both transmissive and absorptive into said inclusions.

Said layer(s) and said one member may constitute sealing strip to be applied to said other member, usefully over a stitched seam of said other member; and such sealing strip constitutes a second aspect of invention including embodied as layers of thermoplastics material, which may be substantially the same or similar for all said layers save for said inclusions in inner or lower said layer(s), or at least compatible for welding together. Outer said layer as said one member is preferably substantially wholly transmissive to said infra-red radiation.

Suitable welding apparatus may comprise beam-producing means including source of infra-red radiation and aperture-defining means both within a rotatable hollow tube substantially transparent to said radiation to make rolling contact with means to or through which the produced beam of said infra-red radiation is applied; and such welding apparatus constitutes a third aspect of invention.

According to other method and apparatus aspects of invention, assessment is provided for weld(s) made by a radiation heated layer(s) below a radiation transmissive layer, the assessment involving using a thermal imaging camera to detect through said transmissive layer radiation from said heat layer(s) that is different from the radiation causing heating for welding purposes. Such other aspects may be additional step to above first aspects of invention.

According to system and apparatus aspects of invention production of members joined by welding involving heated layer(s) interposed between two said members, the layer(s) having inclusions through thickness and responsive to radiation to raise temperature of said layer(s) through thickness in promoting weld-bonds at interfaces with surfaces of said members, the production providing for interposing said layer(s) between said members, applying said radiation to said members with interposed said layer(s), and moving thus irradiated said members from said means for applying.

Said means for interposing may serve to supply one of said members along with said layer(s); and there may be further provision for assessing welding of said irradiated members, say as aforesaid using a thermal imaging camera.

BRIEF DESCRIPTION OF THE DRAWINGS

Specific exemplary implementation for this invention will now be illustrated and described with reference to the accompanying diagrammatic drawings, in which:

FIG. 1 is an outline diagram showing a production line for Insituform lay-flat tube, including forming, seaming, sealing and inspecting stages;

DESCRIPTION OF SPECIFIC EMBODIMENTS

Figure 2A:
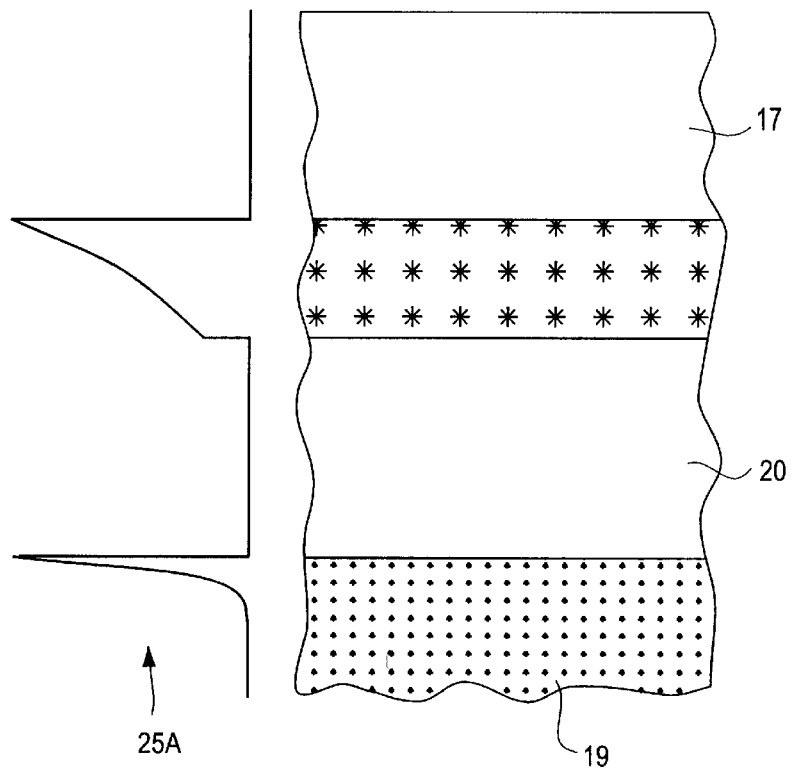
FIGS. 2A and 2B are scrap diagrams of welding tapes having one and two heat welding layers, respectively, each with accompanying indications of heat absorption/emission.

In FIG. 1, plastics coated felt sheet 10 from supply reel 11 is shown passing through guidance and folding station 12 serving to bring its long edges together for seaming into a lay-flat tube form 10T using sewing machine 13 shown in preferred association with sewn-seam inspecting/verifying means indicated as including a suitable optical camera 14. A welding head 15 for covering and sealing the seam as sewn and verified at 13, 14 is indicated in association with a thermal imaging camera 16 for inspection and verification of the welded seam-covering seal produced at head 15, as will be further described below. The welding head 15 is shown operative for two tapes 17 and 18 fed from supply reels 17R and 18R to be upper (or outer) and lower (or inner), respectively, between the welding head 15 and the verified sewn seam of the lay-flat tube 10T, specifically pressed onto outer plastics coating 20 on inner felt layer 19, see arrow 15P for advantageous pressure application and transfer, say by/from weights or pressurized fluid means via the welding head 15 itself.

FIG. 1 also shows control box 21 for electrical/electronic, typically computerised, control of operation and data collection from the optical and thermal cameras 14, 16 and tachometer 22; and operation of the sewing machine 13, the welding head 15, and feed rollers 23 for the coated felt material 10 and tube 10T as folded up, seamed and sealed. If desired, of course, there could be additional or alternative controlled drive of any of the reels 11, 17R, 18R.

In operation as shown, coated felt material 10 goes from right to left in FIG. 1, as pulled by the rollers 23 at a suitable production speed, say about 12 metres/minute. Flat strip 10 unreeled from reel 11, folded in guide etc 12, and edge sewn by sewing machine 13, has any stitching faults detected via the camera 14. Computer controlled/interfacing linescan type cameras for stitching inspection are known along with software with algorithms to detect faults, e.g. dropped stitches, broken or shredded threads, unevenness, etc. Detection of such fault(s) normally leads automatically to stopping production of Insituform tube, and appropriate rectification, thereby preventing sealing encapsulation of bad stitching. The welding head 15 should thus operate to cover and seal only in relation to tube 10T that is correctly sewn.

Preferred welding heads (15) use infra-red radiation and will be further shown and described with a transparent outer roller to press down the two tapes 17, 18 against the coated felt material, though alternative transparent fixed pressure plate provision is feasible. The tapes 17, 18 can be, normally are, of identical widths large enough to completely cover stitching of the seam and sufficiently overlap sideways onto the coated felt to result in desired or required mechanical strength of adhesion by welding as taught herein. They are shown drawn off the reels, 17R, 18R simply by action of the feed rollers 23.

Preferred welding effectively relies on outer layer, represented by the tape 17, being substantially transparent to radiation used for welding purposes, thus to absorb no or not much heat, certainly not to an adversely significant extent; and inner or lower layer, represented by the tape 18, between the outer layer (tape 17) and the outer coating 20 of the felt material tube 10T having such heat absorptivity for said radiation that its temperature will be raised to achieve welding between the applied outer layer (tape 17) and the outer coating 20 of the felt/tube 10/10T. Inclusions that afford partial transmissions are important to assuring such heat absorptivity and achieve suitably softened or partial melt, preferably substantially full melt, state for advantageous practical welding hereof. Intrinsic thermal conductivity of envisaged thermoplastics materials is very low, and preferred thickness of the inner or lower layer 18 (with its predetermined absorptive inclusions) and the outer layer 17 a(t least normally comparatively free of such inclusions) are readily so related that even surface melting of the latter (17) at contact interface with the former (18) molten and under applied pressure will extend little into its thickness, and will net result in much raising of temperature of its outer surface, conveniently insufficient to cause significant problems. Indeed, for inner or lower layer 18 much thinner than outer layer 17, and radiation of sufficient intensity to produce welding softening of the inner or lower layer 18 at envisaged production line speeds (say 12 metres/minute), diffusion of heat outwards is so small and slow that outermost surface temperatures well below 100° C. are practical, typically perhaps no more than about 50° C., and do not persist significantly along the production line, probably less than a metre, at least for practical plastics material such as low density polyethylene for both layers (17, 18), and for which inner layer melt temperatures can be about 150° C. to 200° C. Obviously, not dissimilar considerations apply to the plastics outer coating 20 to which welding is required, and which will also ordinarily be transparent, including optically transparent for the important purpose of visually assessing progress and extent of impregnating, subsequently curing, with liquid thermoset resin during installation in a host pipe.

Achieving melt state of the inner layer or layers 18, or at least softening sufficient for deformation under the preferred application of pressure during welding is highly advantageous, even for thin such layers, in terms of intimately accommodating to surface irregularities whether such as dimples pervading through coating from underlying felt or of seam stitching. Lower or inner layer thickness of from about 0.2 to about 0.5 millimetre can promote stitch about 2:1 for absorption/transmission of applied infra-red (typically principally in the near infra red spectrum). About 30% transmission has proved to be particularly effective at least where there is inherently about 75% reflectivity of heating radiation by normal white felt material 19 under clear polyethylene coating 20. Such reflectivity can significantly help in relation to achieving sufficiently uniform melt/softening of the inner or outer layer 18 through its thickness in context of inevitably exponentially reducing intensity of radiation thus rate of absorption (by the inclusions) with depth through thickness from surface of incidence. It may be further found helpful to view desired action hereof involving the progressive nature (with thickness) of taking energy from heating radiation in terms of any section of depth of the melt/softening layer notionally having its own local source of heat not reliant on thermal conduction.

Content for inclusions that is not constant through the thickness, ideally progressive, would be useful, including where there is less or substantially no reflectivity as above from the felt 19 (or its coating 20); and use of two or more layers is envisaged with different progressively more absorptive inclusion contents, even inclusions as such, at least for parameters such as size etc. It may, of course, be helpful to provide reflectivity by such as specifying reflective inclusions, such as barium sulphate or titanium dioxide, in the coating 20 and/or to provide same in or on lowest layers or surface of the welding material 18.

Figure 2B:
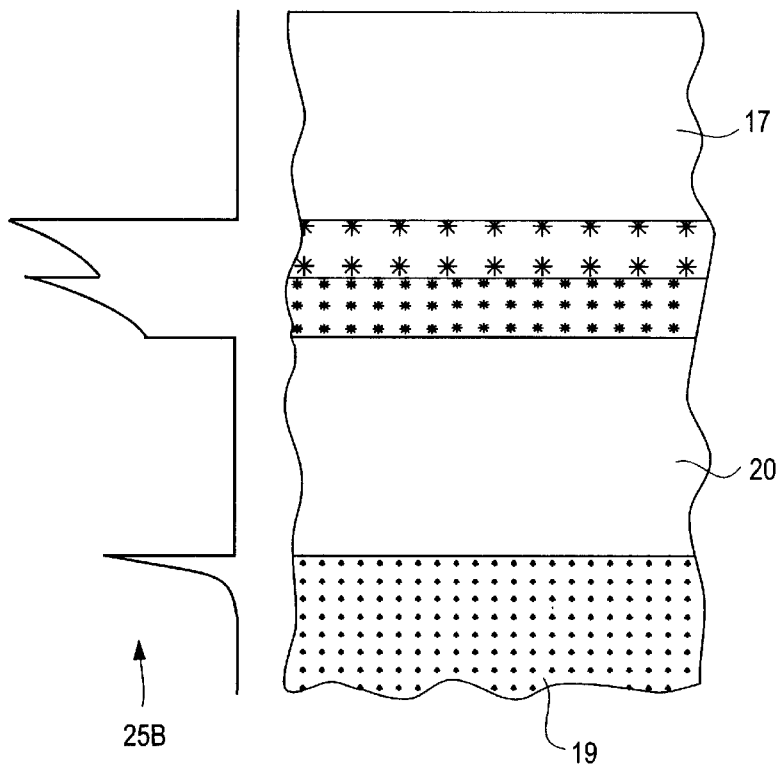

FIGS. 2A and 2B show single and double inner or lower layers 18 and 18A, B between clear applied outer layer 17 and coating 20 on felt core material 19; along with idealised outline indications at 25A, B of absorption per unit depth for heating infra-red radiation applied to and through the outer clear layer 17. Such absorption rate, which is minimal in the clear layers 17 and 18, and results only in close-to-surface heating of what might be quite highly pigmented felt 19, reduces progressively, generally exponentially, in passing through the single layer 18, or through such of the layers 18A and 18B having differential (lesser and greater, respectively) infra-red absorption determining inclusions. Desirable advantage of some of heating radiation passing through the layer 18 or layers 18A, B and being reflected back into such layer(s) is implicit in the representations 23A, B but could be less by design for plural differentially absorptive layers and lower reflectivity provided by the felt material 19 or otherwise to aid more uniform heating of the layers 18 or 18A, B. However, additional or even alternative use or partial use of such passed-through initially unabsorbed radiation can be by way of inclusions in or overlaying of the coating 20 to serve in providing some measure of additional heating at least at the interface with the layer(s) 18. The indications 25A, B will, of course, apply to reflected radiation as though reversed (turned up side down) for the layer(s) 18 and 18A, B.

Overall, of course, the aim is to maximise heating of the layer(s) 18 in as near uniform as possible through its thickness, the ultimate criterion being achievement of a satisfactory conjoining weld. Application over a short length, conveniently but non-limitingly about 50 millimetres, of intense infra-red heating radiation readily produces softly deformable to melt states throughout in the layer(s) 18, i.e. high enough temperatures for quite low input energy; and pressure exerted, say by weights or pressure fluid means acting on the welding head 15, is effective to provide flow of material of the layer(s) 18.

Other useful options include deliberate promotion of scattering and trapping of heating radiation at least in the layer 18, whether by nature of inclusions aiding heating or by other inclusions; and/or promoting repeated reflection by upper or outer reflective return as readily afforded at/by the welding head 15 or even by suitable light coating of the outer layer 17; and/or application of this invention where irradiation is possible from both sides of the desired weld, typically to and through adequately transmissive members/sheets to be joined. Feasibly variable/adjustable factors of relevance greatly encourage development and use of computer modelling to aid selection of variables for particular applications of the invention, including many other than sealing stitched seams of Insituform tube.

Figure 3A:
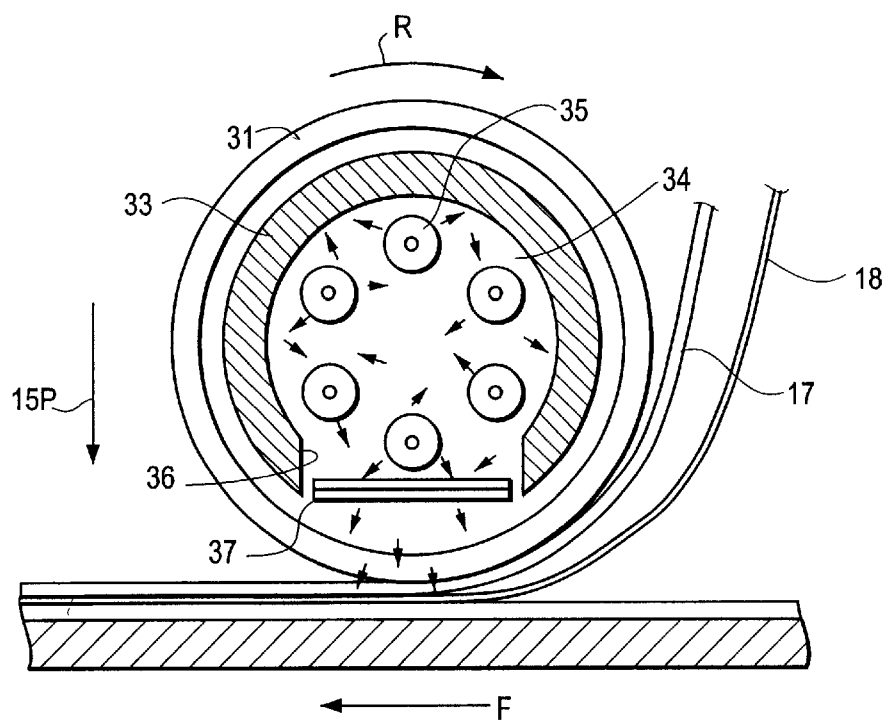
FIGS. 3A and 3B are outline cross-section and side-on views of a seam-sealing welding head.
Figure 3B:
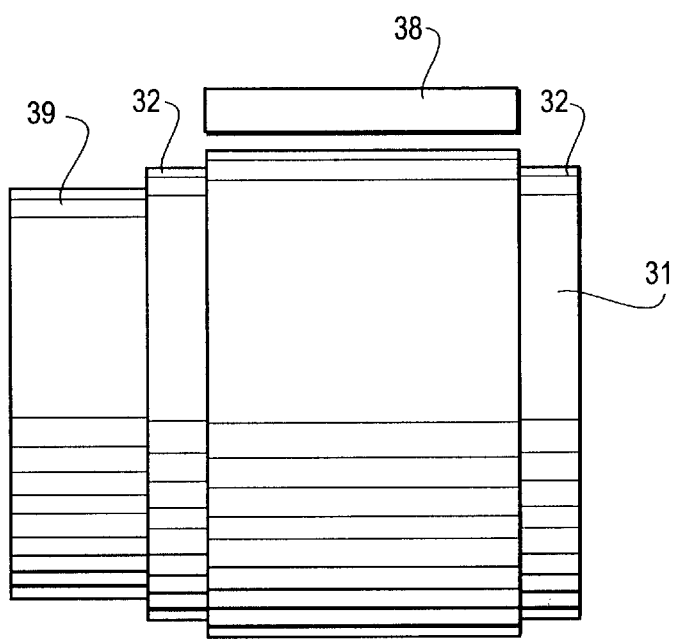

Turning to FIGS. 3A and 3B, one suitable welding head comprises an outer transparent roller tube 31 freely rotatable in bearings 32 and circumscribing an internally reflective generally C-section slotted tubular member 33 affording a reflective inner surface bounding a cavity 34 shown housing an annular array of heating lamps 35. The reflective cavity forming member 33 is shown downwardly open at 36 save for filter provision 37 to block undesired radiation but pass at least radiation of the wavelength(s) desired for heating and welding via the layer 18. At least for applications using carbon black inclusions such as described above, radiation of interest is in the range between about 0.5 and about 2 micrometres, and will be directional out of the apparatus and filter 36 and 37, which may have a dimension in the production direction of about 50 millimetres. Such radiation to be absorbed in the layer 18, even to melting thereof, will not result in the outer surface of the layer 17 heating up to stick to the roller tube 31 without the layer, but any transparency-affecting pick-up of foreign material can be monitored suitably elongate optical means 38. The lamps 35 can be of any suitable type, e.g. incandescent, or gas-discharge or pulsed flash, and fan cooling will normal be provided, see 39. The transparent roller tube 31 can typically be of fused silica or quartz and might be driven, and the filter 36 can be of multiple layers, conveniently of the same plastics material as the layers 17, 18 so as to remove fundamental absorption bands inherent in organic polymers thus reduce risk of surface heating effects that might lead to sticking to the roller 31 and/or give rise to unwanted background image components via the thermal camera 16.

Figure 4A:
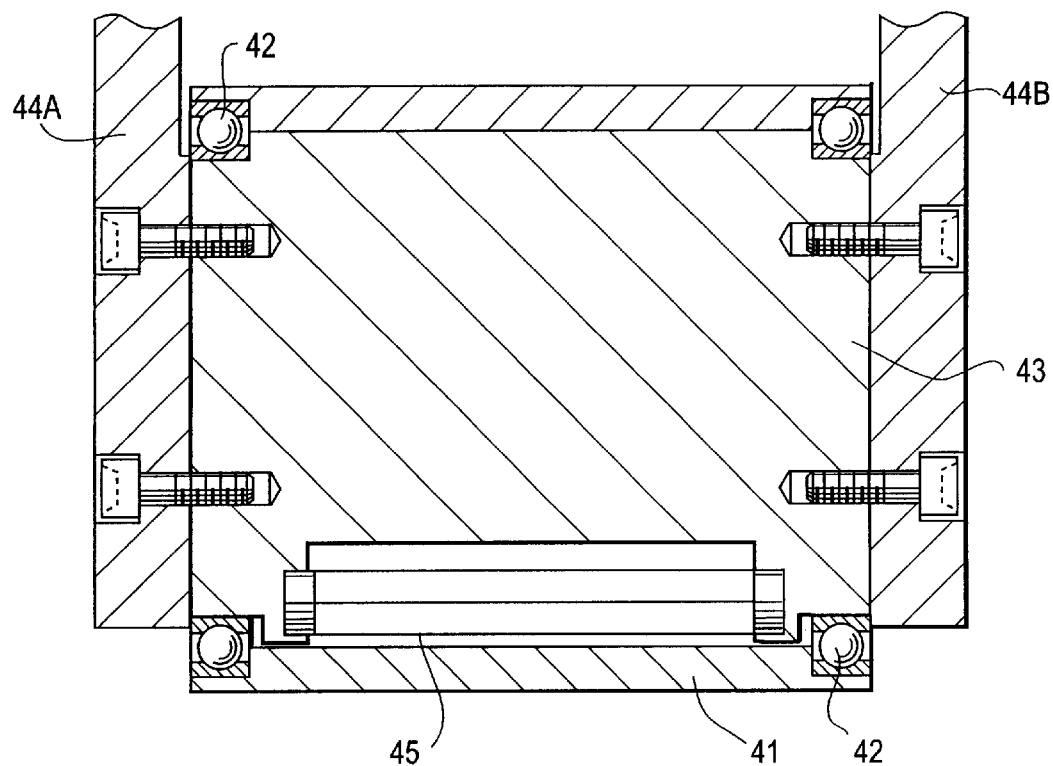
FIGS. 4A and 4B are outline cross- and axial section views of another seam-sealing welding head.
Figure 4B:
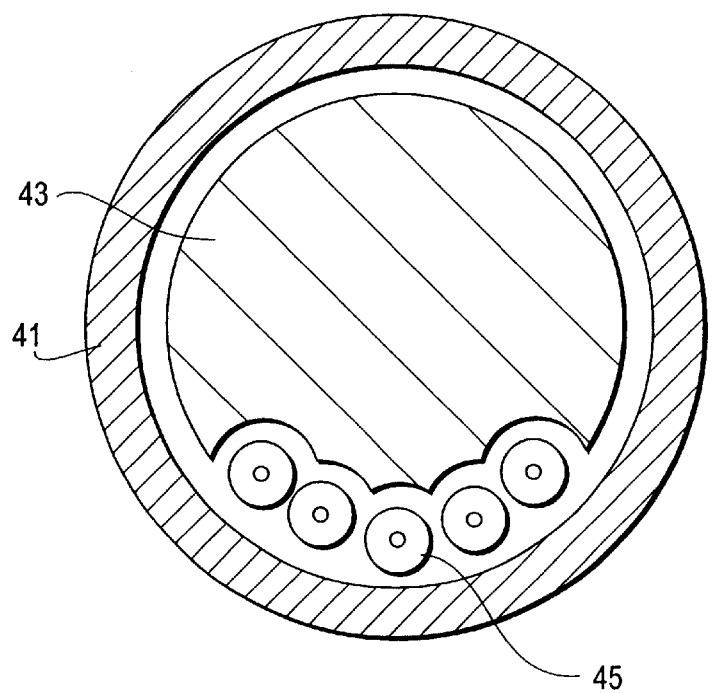

FIGS. 4A and 4B show an alternative welding head showing variant reflector block 43 accommodating lamps 45 in individual reflecting (preferably beam component directing) recesses 44 in an arcuate array, and holted between side plates 44A, B also carrying bearings 42 for the roller tube 41.

It can be advantageous to provide a welding head that can be generally similar to those of FIGS. 3 and 4, but is not machine mounted, and is capable of hand-operation, say for effecting repairs to localised faults in welding.

The thermal imaging camera 16 located at a convenient point after the welding head 15 but before the point where thermal equilibrium is reached, its purpose is to detect failures of the weld and monitor consistency on-line. A weld failure could arise as a result of any contamination, e.g. foreign matter, lamp failure, etc. Temperature gradients are monitored over the width of the weld on the surface of 17, thus effectively progress of the heat pulse generated in the layer(s) 18 in dissipating outwards to exterior of the layer 17. Information from this image can locate points where full welding contact has failed, e.g. a higher than normal/average temperature pulse on the surface being due to poor, even lack of, contact with the coated felt layer 19, 20 during welding—perhaps because the bulk of the coating on the felt is so cold that it has pulled too much heat away from the layer(s) 18; and a lower than normal/average temperature pulse signifying poor thermal, thus likely mechanical, contact between the heated layer(s) 18 and the outer layer 17. A control computer located in box 21 is readily programmed to detect such conditions and to stop the production line in order to for repairs to be effected.

Figure 5:
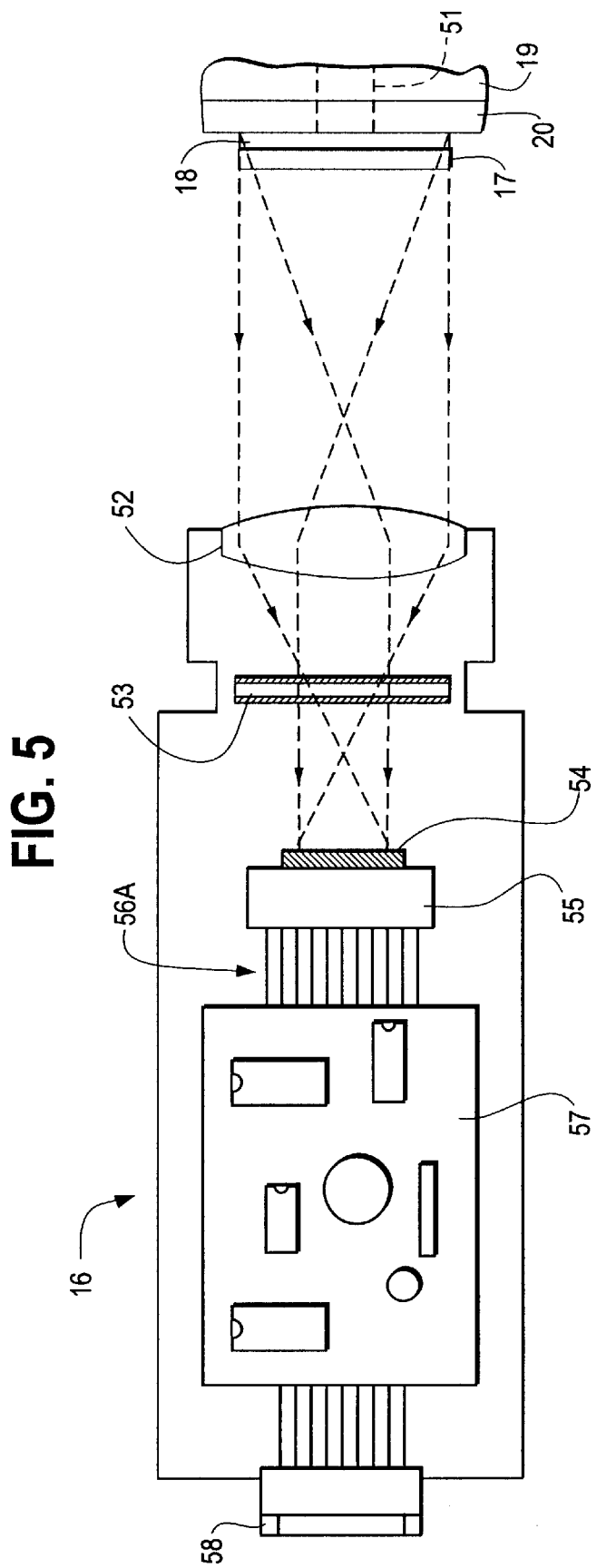
FIG. 5 is an outline axial diagram showing a thermal imaging weld inspection camera.

FIG. 5 shows a practical thermal imaging camera 16 typically of linescan type giving a continuous X, Y image, say of 0.5 mm X and Y resolution, of the temperature across and along the sealed seam with stitching 51 through coated felt 19, 20 under layers 17, 18. The camera 16 has a germanium lens 52 focussing indicated radiation rays through a filter 53 onto a coupled linear photoconductor array 54 shown mounted on a heatsink 55 with connections 56A, B to a printed circuit board 57 carrying digitising interface electronics and thence to connector 58 for signals to and from a computer in box 21 serving to process signals to identify hot spots and cold spots, also black spots and clear spots in welding tape etc.

Thermal imaging camera 16 can be, and preferably is, operative in a different radiation region from the welding head 15, specifically mid-infrared region of wavelength from about 3 micrometres to about 8 micrometres (compared with near visual infra-red of about 0.5 to 2 micrometres from the welding head 15). Radiation at such different wavelengths comes from heating action in the layer(s) 18, and suitable sensing technologies include lead selenide, platinum silicide, thermopile. The thermal imaging camera 16 needs to monitor more nearly average temperature of the melt layer(s) 18 than just surface temperature of the outer layer 17 (as would inevitably be seen by a standard non-selective thermal imaging camera, say using cheaper silicon dioxide sensing) or interface between the transparent outer layer 17 and the welding melt layer 18 (as could occur if the melt layer 18 was more heavily pigmented than taught herein).

Accordingly, the filter 53 serves to reject near-infrared radiation emanating in large amounts of from the welding heat source. It will, of course, be appreciated that the outer layer 17 required/preferred to be transparent to near infrared (from welding head 15) and optically (for assessing thermoset impregnation) must also be transparent to the mid infra-red of interest to the thermal imaging camera 16 and to pass which the filter 53 is preferably closely tuned. Also, the welding/melt layer 18 is semi-emissive (sufficiently lightly pigmented) to allow emitted Mid-IR "heat rays" from deeper levels to pass out through the layer 17 to the camera 16.

Indeed, preferably, the welding layer(s) 18 will be such as also have high emissivity for the mid infra-red wavelength (s) to which the thermal imaging camera 16 is sensitive. In practice, there is substantial correspondence between achieving desired emissivity and achieving desired absorption for the welding layer 18. Difference represented by desired emissivity and absorptivity being at mid infra-red and near infra-red, respectively, does not necessarily result in using different inclusions for the two purposes. Indeed, emissivity is thermal radiation by a hot body, thus the reverse of absorption for heating purposes, and a single computer modeller can be used for specifying inclusions, and aforesaid specific particles of carbon black have satisfactorily served both purposes in the inner/lower welding/melt layer(s) 18.

Practically, the thermal imaging camera 16 sees a thermal signal, which for any one point in the image, is made up of energy from the top of the layer(s) 18 as the strongest signal but with added signals from deeper levels (which must have progressively weakening, but according to the same exponential decay as applies to absorption, i.e. according to Beer's Law,). Emissivity of layer(s) 18 can also be represented as at 25A. B in FIGS. 2A, B.

INDUSTRIAL APPLICABILITY

Use of visible and near-infrared radiant energy interacting with partially absorptive inclusions, and simultaneously applied mechanical pressure, to weld sealing strip over a seam, typically as a lamination of clear and controlled additive tapes, onto coating already on such as felt material, usually with tapes and coating all of substantially the same thermoplastic material has particular benefits lay-flat Insituform tube, including being free of limitations and dependencies of process speed. The process of radiative heat transfer is much quicker than relying on thermal conduction through plastics materials of inherently low thermal conductivity/diffusivity and gives high thermal gradients without causing burning or risking insufficient heating.

However, much wider application of such techniques hereof is envisaged wherever there is call for joining members by welding using heat absorption in an interposed layer.

What is claimed is:

1. Method of heat-welding two members, the method comprising:

applying radiation through a first member to at least one layer interposed between the two members, said layer having inclusions through its entire thickness which inclusions are responsive to said radiation to raise temperature of said layer through thickness thereof and promote bonds at interfaces with surfaces of said members; and applying bond-aiding pressure directed through thickness of said layer rendered deformable by heat absorbed by said inclusions, said pressure being applied by means making freely rolling or sliding contact with said first member, wherein said layer and said first member constitute a sealing strip applied over a stitched seam of the second member.

2. Method of heat-welding according to claim 1, wherein said radiation is infra-red radiation, and said sealing strip comprises said first member substantially wholly transmissive to said infra-red radiation, said first member being of low thermal conductivity and sufficient thickness to be cool enough at its outer surface to allow freely rolling or sliding pressurizing contact therewith, and at least one layer of themoplastics material having inclusions through thickness to absorb some of incident infra-red radiation in heating said layer up to a welding state relative to said second member.

3. Method according to claim 2, further comprising the step of assessing said bond using a thermal imaging camera to detect through said first member a radiation arising from said heated layer that is different from the infra-red radiation causing heating thereof for welding purposes, said first member being transmissive to both of said infra-red and arising radiations.

4. Method of bonding two members by heat-welding, the method comprising:

applying radiation through a first member to at least one layer interposed between the two members, said at least one layer having inclusions through its entire thickness, which inclusions are responsive to said radiation to raise temperature through the thickness of said layer and promote bonds at interfaces with surfaces of said members; and applying bond-aiding pressure directed through thickness of said layer rendered deformable by heat absorbed by said inclusions, said pressure being applied by means making freely rolling or sliding contact with a said member, wherein the second member reflects a sufficient part of said radiation that has passed through the thickness of said layer back into the layer to further raise said temperature and promote said bonds.

5. The method according to claim 4, wherein said radiation is applied to said first member through said means for applying bond-aiding pressure.

6. Method of bonding two members by heat-welding according to claim 5, wherein said radiation being generated within said means for applying pressure.

7. Method according to claim 4, wherein said radiation is an infra-red radiation, said first member being transparent to such radiation, and said layer being partly transmissive to the radiation, having inclusions through its thickness absorbing the radiation.

8. The method of bonding two members by heat-welding according to claim 4, comprising two layers interposed between said first and said second members, wherein first layer being provided adjacent to the first member and second layer adjacent to the second member, and the first and second layers are provided with inclusions such that when encountered sequentially by the radiation, the second layer is responsive to the radiation to a different extent that the first layer.

9. Method of bonding two members by heat-welding, comprising:

applying radiation through first substantially transmissive member to at least one layer interposed between the two members, said layer having inclusions through its entire thickness, which inclusions are responsive to said radiation by raising temperature of said layer through thickness and promoting bonds at interfaces with surfaces of said members;

applying bond-aiding pressure directed through the thickness of said layer rendered deformable by heat absorbed by said inclusions, and pressure being applied by means making freely rolling contact or sliding contact with said first member; and assessing said bond using a thermal imaging camera to detect through said transmissive first member an arising radiation from said layer that is different from the radiation which provides heating thereof for welding purposes.

10. Method of bonding two members by heat-welding according to claim 8, wherein heating radiation being generated within said means for applying pressure.

* * * * *